Dec. 18, 1956 C. M. L. L. BOURCIER DE CARBON 2,774,446

SHOCK ABSORBERS

Filed Oct. 14, 1952

INVENTOR
Christian Marie Lucien Louis Bourcier de Carbon

BY Watson, Cole, Grindle & Watson

ATTORNEYS

United States Patent Office 2,774,446

Patented Dec. 18, 1956

2,774,446

SHOCK ABSORBERS

Christian Marie Lucien Louis Bourcier de Carbon, Neuilly-sur-Seine, France

Application October 14, 1952, Serial No. 314,714

Claims priority, application France May 5, 1952

2 Claims. (Cl. 188—88)

This invention relates to shock absorbers, and more particularly to shock absorbers of the hydropneumatic type primarily, though not exclusively, adapted to be used in connection with vehicle wheel suspensions.

This invention embodies certain improvements and modifications over portions of the subject matter of my copending application Ser. No. 99,796, filed June 17, 1949, now Patent No. 2,721,074, granted October 18, 1955.

In the suspension of land vehicles, or more precisely in devices for connecting the wheels to the chassis, it is necessary to distinguish between two essential functions of an absolutely different nature:

(1) The spring action intended to elastically support the weight of the vehicle. This function is essentially a conservation of energy, i. e., it is carried out without conversion of mechanical energy into heat.

(2) The shock absorbing action intended to limit both the amplitudes of oscillation of the chassis and the amplitudes of oscillation of the wheels. This function is essentially an energy dissipator, i. e., it converts the mechanical energy stored in the spring upon its deformation into heat. A shock absorber, as a matter of fact, is essentially an energy-dissipating brake which opposes the relative motion of the axle and the chassis.

The importance of utilizing the shock-absorbing action to provide a comfortable suspension as well as for ability to hold the road has now been recognized. This is why in present automobiles these two functions, namely the spring and shock-absorbing functions, are separated from each other and taken care of by two different apparatus; the spring action is, as a matter of fact, generally seen to by metal springs (helical springs, torsion bars, leaf springs), and sometimes by rubber springs, while the shock-absorbing action is taken care of in particular either by hydraulic shock absorbers or by friction shock absorbers.

For the purpose of simplification and economy or in order to lighten the weight, it has already been suggested to make use of the elasticity of air or of a gas in order to support the weight of the chassis and to effect the spring and shock-absorber actions within a single apparatus which then forms a dampened pneumatic spring (pneumatic shock-absorber spring). This is furthermore what is generally done in the suspension member of landing gears of modern airplanes.

The simultaneous effecting of the two functions within a single apparatus poses many problems and such an apparatus which is intended to support all of the weight of the chassis (or a substantial part thereof) and which will be called a dampened spring or dampened suspension, is, as a matter of fact, an apparatus which is essentially different from a shock absorber proper (a simple energy dissipating brake which does not substantially assist in elastically supporting the weight of the vehicle).

The distinction between these two kinds of apparatus is important and is all the more necessary as technical terminology is still rather imperfect in this connection.

For instance, in the English language the same word "shock absorber" is frequently applied without distinction to a simple suspension spring, a dampened suspension and a shock absorber proper.

In order to understand to what extent a dampened pneumatic spring may be a technically different apparatus from a pneumatic shock absorber which does not substantially assist in supporting the weight of the vehicle, it is merely necessary to notice the following:

Air is extremely expandable as a function of temperature. From this it follows that it is practically impossible to have, when using a pneumatic spring of the above type, an unchanging regulation of the height of the chassis, regardless of the outside temperature. This drawback is all the more serious as the role of energy-dissipating brake is accomplished by a large release of heat inside the apparatus. This drawback condemns the use of all pneumatic shock absorbers which also act thus as springs. On the other hand, this drawback, of course, does not exist in connection with pneumatic shock absorbers which do not substantially aid in supporting the weight of the vehicle.

Likewise, and for the same reason, small leaks of compressed fluid, which are not very important in the case of simple pneumatic shock absorbers, would be disastrous in the case of dampened pneumatic springs.

Pneumatic pressure apparatus used as dampened springs for vehicles are therefore already known, and in particular as used for the suspension of airplanes. However, in these apparatus, the sole recognized purpose of the high gas pressure is to effect the suspension spring action. It does not appear that up to the present time there has been recognized the necessity of high gas pressures in apparatus which are to be used as simple, pneumatic shock absorbers, not playing any substantial role as suspension springs. This use of high pneumatic pressure in shock absorbers proper constitutes the general object of the present invention.

A hydraulic shock absorber of the telescopic type for use on motor vehicles, essentially consists of a working cylinder which is filled with liquid and within which there moves a piston carried by a cylindrical rod and having passages controlled in such a manner as to permit the liquid to pass through the piston so as to permit the displacement of the piston within the working cylinder while assuring resistance, i. e. a predetermined braking to this movement of the piston.

The piston rod extends from the working cylinder through a sealing or packing device and, as liquids are noncompressible, or at best compressible only to an infinitesimal degree under tremendous force, there must always be contemplated a device for assuring compensation for the volume of the rod so as to avoid the appearance of cavitation phenomena in case of incomplete filling, or the bursting of the working cylinder in case it is completely filled. The various types of hydraulic shock absorbers differ in the manner in which this compensation arrangement is realized.

In most of the conventional telescopic shock absorbers, this compensation for the volume of the rod is effected by the provision of a reservoir chamber outside of the working cylinder and partially filled with oil, which communicates with the working cylinder through controlled passageways of very small section for the passage of the liquid from the working cylinder to the reservoir chamber upon the inward motion of the rod so as to produce a high resistance to flow of the liquid in this direction; much larger openings being exposed upon motion in the opposite direction so as to permit an easy return of the liquid from the reservoir chamber to the working cylinder.

There have already been suggested (for instance in

U. S. Patent No. 2,410,176 to Magrum of Oct. 29, 1946) various arrangements not having these controlled passages of small section between a reservoir chamber which is partly filled with oil and the working cylinder, these devices all being characterized by the elimination of the reservoir chamber and its replacement by a movable wall at the end of the cylinder opposite the piston rod, for instance by a movable end wall subjected to spring pressure or else by a rubber bladder which is inflated with air.

Such arrangements have, however, been suggested only in the case of single-acting shock absorbers which give a braking action particularly when pushed out, i. e. in the case of shock absorbers provided with pistons having no resistance or having only a slight resistance to inward motion. In this case, a moderate pressure which applies the movable wall against the shock absorber liquid suffices to assure satisfactory operation of the apparatus and the manufacture of such apparatus does not raise any particular problems.

This is no longer the case when a double-acting piston is used, the braking action of which is of practically the same intensity or same magnitude in both directions of movement of the piston. The present applicant, contrary to a rather general belief on the part of automobile engineers, has been able to establish that the ideal shock absorber is not one having a weak braking action during the forcing-in of the piston but rather one the braking action of which is practically symmetrical in both directions.

A moving-wall device which is satisfactory in the case of the single-acting shock absorber is no longer satisfactory, unless new precautions are taken, in the case of a double-acting shock absorber the braking action of which is practically symmetrical in both directions. Such a solution can only give good results if a movable-wall device is used which creates a high permanent pressure inside the liquid. Theoretical considerations confirmed by actual experience show that in connection with the customary passenger cars and with shock absorbers of acceptable dimensions, this satisfactory minimum pressure is in the vicinity of 5 to 6 atmospheres when the shock absorber is located directly between the axle of the wheel and the frame, so that the piston moves 1 cm. in the cylinder when the frame itself moves 1 cm. with respect to the axle.

When the method of locating the shock absorber is such that the axle must move $x$ cm. with respect to the frame for the piston to move 1 cm., the present applicant has found that for ordinary passenger cars and for shock absorbers of acceptable dimensions, this satisfactory minimum pressure must be multiplied by the coefficient $x$ and therefore amounts to $5x$ or $6x$ atmospheres.

These data are valid for the customary passenger cars, the no-load weight of which is about 1 to 1½ metric tons, that is to say, 1000 to 1500 kg. In the case of automobiles of substantially different weight, for instance trucks, in view of the fact that in such case it is possible to use pipes or tubes of larger diameter, the minimum internal pressure for assuring satisfactory operation of the apparatus is then about 2 M atmospheres, M being the weight of the vehicle in metric tons. For a 10-ton truck and for shock absorbers which are acceptable from a technical and economic standpoint, it would therefore be necessary to use an internal pressure of at least 20 atmospheres.

It is furthermore easy to measure the internal pressure $p$ used in a permanent pressure liquid shock absorber; it is sufficient, as a matter of fact, to measure the force $F$ necessary to completely push the rod in slowly. This force $F$ is then related on the one hand to the internal pressure $p$ and on the other hand to the cross-section $s$ of the rod by the simple equation $F = p \cdot s$. If, however, the sealing joint exerts a noticeable friction $f$ on the rod, this must be taken into account either by direct measurement or by using for $F$ the arithmetical mean between the force $F_1$ necessary to completely introduce the rod and the force $F_2$ with which the rod tends to move out again. Obviously, we thus have:

$$F_1 = F + f; \quad F_2 = F - f$$

and therefore $$F = \frac{F_1 + F_2}{2}$$

A second aspect of the present invention resides in the design of the moving-wall device intended to create the high internal pressure necessary for the operation of the apparatus.

Other objects and features of novelty, including provisions for inflating the shock absorber, and the alternative use of a mechanical spring device for applying the desired pressure to the working fluid, will be apparent from the following detailed specification, when read in connection with the accompanying drawings in which certain embodiments of the invention are illustrated by way of example.

Figures 1, 2, 2A, 3, 4:
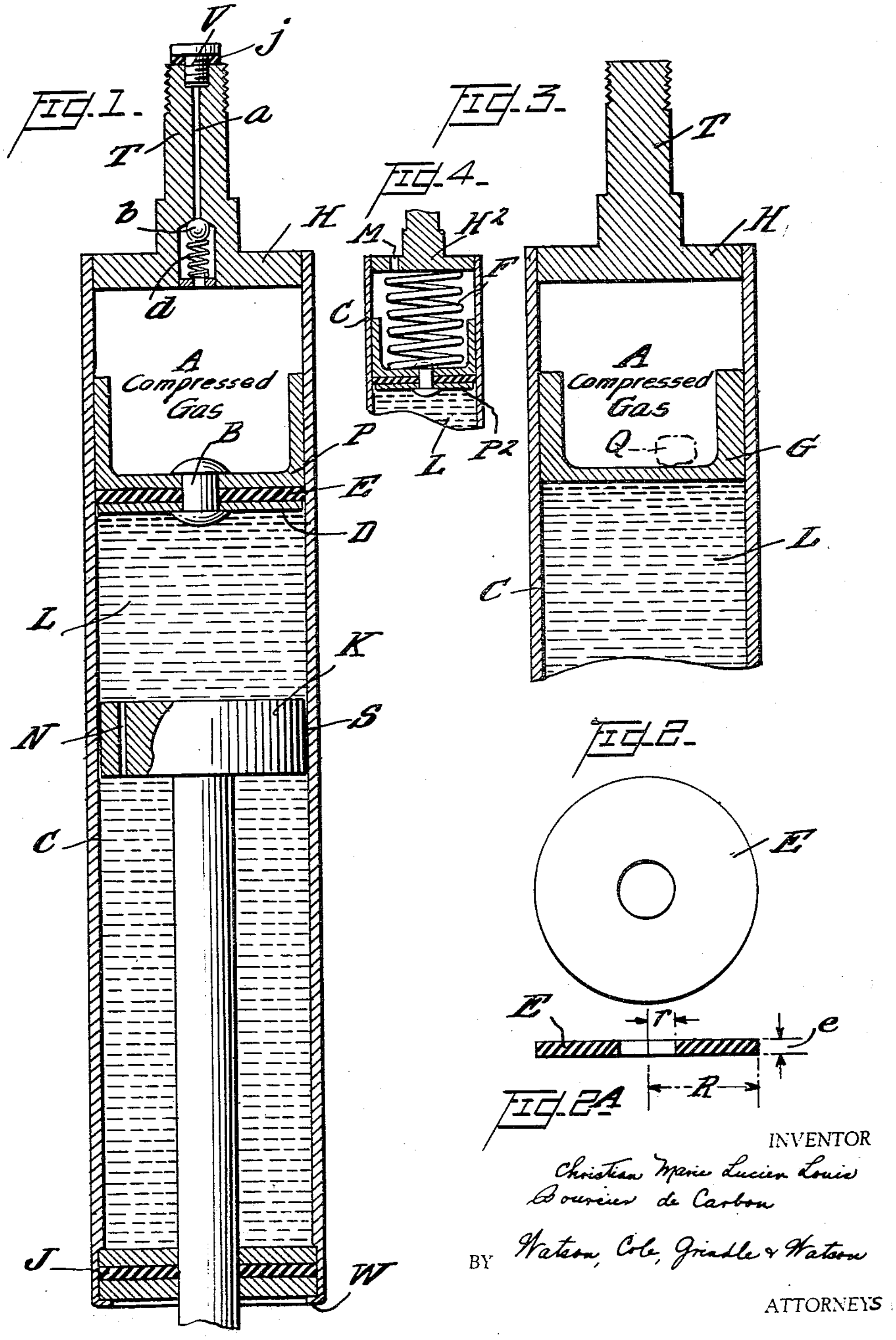
Figure 1 is a view in longitudinal section of a shock absorber comprising one embodiment of the invention.
Figure 2 is a plan view of a disc or gasket such as may be used in sealing the movable wall or partition in the shock absorber.
Figure 2A is a transverse sectional view through the disc.
Figure 3 is a fragmentary view in longitudinal section of a modification of the invention.
Figure 4 is a similar view on a reduced scale of a mechanical variation in the invention.

The shock absorber shown in Figure 1 comprises a cylinder C suitably connected with one of the relatively movable members and having a working piston K with a piston rod Y connected with the other member. The piston is, of course, provided with a by-pass pasageway N or a laminar annular by-pass clearance space S, or both, to permit a throttled flow past the piston as it reciprocates. The rod Y passes through a packing device J providing the end wall of the cylinder, the construction of which may be the same as those described in my copending application Serial No. 102,784, filed July 2, 1949, now abandoned, or the continuation-in-part of that application, filed on February 8, 1952 as Serial No. 270,587, or still another continuation-in-part application which eventuated into Patent No. 2,719,612 on October 4, 1955.

The arrangement featured in Figure 1 includes a movable end wall or partition having the shape of a piston P made of metal or plastic, provided with a gasket E, one of the faces of said piston being in contact with the mass of liquid L and being pressed against this liquid mass by the action of gas or air A under strong pressure.

One can compare this construction with an arrangement where the piston P presses against the liquid L by the action of a spring, for instance a coil spring compressed between the tight piston P and the end H of the cylinder. However, the solution of the problem which consists of using a compressed gas is definitely preferable inasmuch as on the one hand it is much more economical and on the other hand it is technically superior; as a matter of fact, if a spring is used, the internal pressure $p$ of the liquid acts to tend to force back the liquid L from the other side of the piston P around the gasket E, which raises in this case a serious problem with regard to the gasket; whereas, if a compressed gas is used, the internal pressure $p$ of the liquid is balanced by an equal gas pressure on the other side of the piston and therefore the pressure is equal on both sides of the gasket which considerably simplifies the problem of the effectiveness of this gasket.

In order to reduce the friction of this gasket as much as possible—which is desirable for the good operation of the apparatus—it preferably consists (Fig. 2) of a flat rubber disc perforated at its center and with a thickness $e$ of about 2 to 3 mm., the difference between its outer radius R and its inner radius $r$ being relatively large as compared with its thickness $e$. This sealing disc can be housed in a groove of the piston or applied to the end of the piston by means of a metal disc D which itself may be fastened to the piston by a central screw or rivet B.

Another particularly simple arrangement consists in making the entire piston of a single piece of cast rubber having the form of a cup G in accordance with the showing in Figure 3.

Finally, a last variant would consist in replacing the sealing piston between the liquid and compressed gas by a simple float consisting for example of a disc of cork or sponge rubber; however, this arrangement requires that the shock absorber be approximately vertical, the end H being at the top, a condition which is not necessary with the other arrangements.

As the shock absorber must be inflated with compressed air or gas, it is necessary to provide suitable inflation means. A particularly convenient arrangement for this valve, which arrangement constitutes part of the present invention and is good in connection with any pneumatic pressure automobile shock absorber, is shown diagrammatically in Figure 1 and consists in housing this inflation valve at the center of the threaded rod T found on most of the present telescopic shock absorbers, to fasten the absorbers either to the frame or to the axle. There will therefore be used a fastening rod T through which a channel $a$ is drilled. This channel may be provided at its inner end with a pressurizing valve consisting for instance of a ball $b$ and a coil spring $d$; it may be closed at its upper end after applying the proper pressure either by welding or by a screw V which compresses a sealing washer $j$.

Finally—and this also constitutes part of the present invention—this pressurizing valve may itself be eliminated, which has the double advantage of lowering the cost price and eliminating the danger of leakage of compressed air due to the following system.

As the end H is first of all welded to the cylinder C, the compensating piston P provided with its sealing joint is then introduced into the cylinder through the opposite end whereupon the working piston K of the shock absorber provided with its rod M is introduced; due to this the compensating piston P pushed by the piston K of the shock absorber can be pushed up to a few centimeters from the end H, thus compressing in a reduced space and under a relatively high pressure all the air initially contained in the cylinder C. The end H being then turned upside down, the cylinder C can then be filled with oil, whereupon the sealing joint J is put in position and held by simple crimpling of the edges W of cylinder C. The shock absorber is then filled with oil and is now pressurized and ready to operate.

The application of gas under pressure by this method may be as intense as desired if care is taken to introduce into cylinder C at the beginning of the operation a few pieces of Dry Ice or any other liquefied or solidified gas, such as suggested at Q in Figure 3, which upon evaporation increases greatly in volume.

A further variation in the application of the principles of the invention, by which certain of the objects may be attained but which is not the preferred embodiment, is illustrated in Figure 4 of the drawings. In this arrangement the compressed gaseous fluid above the floating partition $P_2$ is omitted and a coil spring F substituted therefor. A relief opening M may be made in the top wall $H_2$ of the cylinder C in this case, in order to permit the intake and exhaust of atmospheric air, the spring F exerting substantially the sole operative pressure on the partition. In any event, the pressure exerted upon the partition and thus the body of working fluid must be the equivalent of not less than five atmospheres, the preferred approximate ranges of pressure having been already set forth in the present specification.

It is understood that various other changes and modifications may be made in the embodiments disclosed herein without departing from the scope of the invention as determined by the subjoined claims.

Having thus described the invention, what is claimed as new and desired to be secured by Letters Patent is:

1. A double acting shock absorber of the class of those adapted to function as energy-dissipating brakes for cushioning the relative movement between two members without contributing to any substantial degree to the support or springing of said members; said shock absorber comprising, in combination, an air-tight and liquid-tight casing adapted to be connected to one of said members and enclosing a single substantially cylindrical working chamber, a working piston disposed in said chamber and adapted to reciprocate therein upon relative movement of the members, a slender piston rod of the conventional small diameter relative to the diameter of the cylinder which characterizes this class of shock absorber as opposed to fluid suspension devices, said piston rod having one end fixed to said piston and its opposite end secured to the other of said members, said rod passing through a packed opening in one end of said casing, a body of working liquid in said working chamber within which liquid the piston moves, and means providing severely restricted by-passing of the working liquid past the piston in both directions as the piston moves respectively in its compression and rebound strokes, and an anti-cavitation provision comprising the following: a fixed body of compressible gaseous fluid within the single working chamber of the casing at the opposite end thereof, said fixed body of compressible gaseous fluid being under a permanent high pressure of at least about five atmospheres and a maximum pressure only sufficient to prevent the occurrence of cavitation in the working fluid upon movement of the piston and not enough to afford suspension means for the members, said provision also affording compensation in volume for the displacement of working liquid occasioned by the entrance of successive portions of the piston rod upon the compression stroke of the shock absorber, the sole operative agencies controlling the damping of the piston movement, comprising the liquid by-passing means and the compressible gaseous fluid body, being contained within the said chamber.

2. A substantially symmetrically double-acting shock absorber of the class of those adapted to function as energy-dissipating brakes for cushioning the relative movements in each direction between the chassis and the wheel mounting of a motor vehicle, without contributing to any substantial degree to the support or springing of said chassis; said shock absorber comprising, in combination, an air-tight and liquid-tight casing adapted to be connected to said chassis and enclosing a single substantially cylindrical working chamber, a working piston disposed in said chamber and adapted to reciprocate therein upon relative movement of the chassis and wheel mounting, a slender piston rod of the conventional small diameter relative to the diameter of the cylinder which characterizes this class of shock absorber as opposed to fluid suspension devices, said piston rod passing through a packed opening in the lower end of said casing, a body of working liquid in said working chamber within which the piston moves, and means providing severely restricted by-passing of the working liquid past the piston in both directions as the piston moves respectively in its compression and rebound strokes, and an anti-cavitation provision comprising the following: a fixed body of compressible gaseous fluid within the single working chamber of the casing at the upper end thereof above said body of working liquid, a floating partition-piston bounding the upper surface of the body of working liquid and separating it from said fixed body of compressible gaseous fluid, and having a sliding fit within the walls of the chamber, the movable members in the single chamber, namely the working piston and the floating partition-piston comprising the sole partitioning means of said chamber, said fixed body of compressible gaseous fluid being under a permanent high pressure of at least about five atmospheres and a maximum pressure only sufficient to prevent the occurrence of cavitation in the working fluid upon movement of the piston and not enough to afford suspension means for the chassis, said provision also affording compensation in volume for the displacement of working liquid occasioned by the entrance of successive portions of the piston rod upon the compression stroke of the shock absorber, the sole operative agencies controlling the damping of the piston movement, comprising the liquid by-passing means and the compressible gaseous fluid body, being contained within the said chamber.

References Cited in the file of this patent

UNITED STATES PATENTS

| | | |
|---|---|---|
| 1,498,925 | Maillett | June 24, 1924 |
| 1,956,668 | Charles | May 1, 1934 |
| 2,045,027 | Sanford | June 23, 1936 |
| 2,057,893 | Gross | Oct. 20, 1936 |
| 2,101,757 | Schumacher | Dec. 7, 1937 |
| 2,172,346 | Burns | Sept. 12, 1939 |
| 2,367,977 | Thornhill | Jan. 23, 1945 |
| 2,554,581 | Levy | May 29, 1951 |
| 2,595,426 | Thornhill | May 6, 1952 |
| 2,661,203 | Gordon et al. | Dec. 1, 1953 |

FOREIGN PATENTS

| | | |
|---|---|---|
| 1,667 | Australia | of 1931 |
| 793,268 | France | Nov. 16, 1935 |